US006288381B1

(12) United States Patent
Messina

(10) Patent No.: US 6,288,381 B1
(45) Date of Patent: *Sep. 11, 2001

(54) INTEGRATED SYSTEM FOR LINE-OF-SIGHT STABILIZATION AND AUTO-ALIGNMENT OF OFF-GIMBAL PASSIVE AND ACTIVE ELECTRO-OPTICAL SENSORS

(75) Inventor: Peter V. Messina, Santa Monica, CA (US)

(73) Assignee: Raytheon Company, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/383,711

(22) Filed: Aug. 26, 1999

(51) Int. Cl.[7] .............................. G01B 11/26; G01C 1/00
(52) U.S. Cl. ...................... 250/201.1; 356/138; 359/401
(58) Field of Search ............................ 250/201.1, 504 R; 356/18, 138, 145, 253, 139.05, 141.3, 152.1; 359/401, 554–557

(56) References Cited

U.S. PATENT DOCUMENTS

| 4,330,204 | 5/1982 | Dye . | |
|---|---|---|---|
| 4,701,602 | 10/1987 | Schaefer . | |
| 4,798,462 | 1/1989 | Byren . | |
| 4,812,639 | 3/1989 | Byren . | |
| 5,479,025 | * 12/1995 | Huniu et al. | 250/504 R |
| 5,506,675 | * 4/1996 | Lopez et al. | 356/152.1 |
| 6,020,955 | * 2/2000 | Messina | 356/138 |

* cited by examiner

Primary Examiner—Stephone B. Allen
(74) Attorney, Agent, or Firm—Leonard A. Alkov; Glenn H. Lenzen, Jr.

(57) ABSTRACT

An alignment and stabilization system that automatically aligns and stabilizes off-gimbal electro-optical passive and active sensors. The system dynamically boresights and aligns one or more sensor input beams and an output beam of a laser using automatic closed loop feedback. The system includes a reference light (photo) detector, or reference source, disposed on a gimbal, off-gimbal optical-reference sources, or corresonding photodetectors, and two alignment mirrors. Aligning the one or more sensors and laser to the dynamically steered null of the on-gimbal reference photodetector (or reference source) is equivalent to having the sensors and laser mounted on the stabilized gimbal with alignment mirrors providing a common optical path for enhanced stabilization of the sensors and laser lines of sight.

15 Claims, 8 Drawing Sheets

INTEGRATED SYSTEM FOR LINE-OF-SIGHT STABILIZATION AND AUTO-ALIGNMENT OF OFF-GIMBAL PASSIVE AND ACTIVE ELECTRO-OPTICAL SENSORS

BACKGROUND

The present invention relates generally to electro-optical systems, and more specifically, to a system that provides for line of sight stabilization and auto alignment of off-gimbal passive and active electro-optical sensors.

The assignee of the present invention manufactures electro-optical systems, such as forward looking infrared (IR) receivers and laser designator/range receiver systems, for example, that include passive and active sensors. A typical electro-optical system includes subsystems that are located on a gimbal while other subsystems that are located off of the gimbal.

Some off-gimbal sensor and laser systems have no auto-alignment of the sensor and laser lines of sight nor any compensation for any motion due to vibration, thermal or g-force angular deformation in and between the two optical paths. Large errors between the sensor and laser lines of sight are present that limit the effective laser designation ranges, weapon delivery accuracy, and target geo-location capability, all of which require precise laser and sensor(s) line of sight alignment and stabilization.

The resolution and stabilization requirements for third generation tactical airborne infrared (IR) systems are in the same order of magnitude as those required by space and strategic systems, but with platform dynamics and aerodynamic disturbances that are orders of magnitude higher, even above those encountered by tactical surface systems. The environments of third generation airborne system approach both extremes and can change rapidly during a single mission. However, conformance to the physical dimensions of existing fielded system is a driving constraint in their design.

Ideally, a high resolution imaging and laser designation system in a highly dynamic disturbance environment would typically have, at least, a four gimbal set, with two outer coarse gimbals attenuating most of the platform and aerodynamic loads and the two inner most, flexure suspended gimbals providing fine stabilization, with the inertial measurement unit (IMU), IR and visible imaging sensors, and a designating/ranging laser located on the inner most inertially stabilized gimbal.

To reduce gimbal size, weight and cost, the assignee of the present invention has developed a pseudo inner gimbal set for use on various tactical airborne and airborne surveillance systems. This pseudo inner gimbal set uses miniature two-axis flexure suspended mirrors mounted on the inner gimbal together with the IMU and IR sensor, in a residual inertial position error feedforward scheme. The pseudo inner gimbal set replaces the two innermost fine gimbals, while maintaining equivalent performance. With increasing aperture size and constraints required to maintain the size of existing fielded systems, some tactical airborne IR systems are forced to locate the IR and visible sensors and laser off the gimbals using an optical relay path.

In order to re-establish the ideal configuration, an on-gimbal IR sensor(s) and laser configuration can be implemented with an active auto-alignment scheme employing miniature two-axis mirrors, laser reference source(s) and a photodetector. An active auto-alignment and fine stabilization configuration would in effect be equivalent to having the IR sensor(s) and auxiliary components, such as a laser, all mounted on the stabilized inner gimbal. This configuration may be used with any off gimbal multi-sensor system requiring a coincident and stabilized line of sight (LOS), such as targeting systems, and the like.

A previously developed off-gimbal sensor and laser auto-alignment system developed by the assignee of the present invention that provides for such an auto-alignment scheme is disclosed in U.S. Pat. application Ser. No. 09/152,952, filed Sep. 14, 1998, entitled "System for Pseudo On-Gimbal, Automatic Line-of-sight Alignment and Stabilization of Off-Gimbal Electro-Optical Passive and Active Sensors". This system has a separate two-axis mirror on an inner gimbal to perform the enhanced line of sight stabilization function to dynamically steer both beams along laser and IR sensor lines of sight. The steering command to the stabilization mirror is the residual position error of inertial rate loops that inertially stabilize the inner gimbal. An on-gimbal auto-alignment photodetector is operated at null.

It is an objective of the present invention to provide for an improved system that provides for line of sight stabilization and auto alignment of off-gimbal passive and active electro-optical sensors, and which improves upon the system disclosed in the above-identified patent application.

SUMMARY OF THE INVENTION

To accomplish the above and other objectives, the present invention comprises an integrated system for providing automatic line of sight alignment and stabilization of off-gimbal electro-optical passive and active sensors. The system dynamically boresights, aligns and stabilizes one or more sensor input beams and a laser output beam with automatic closed loop feedback with an on-gimbal reference light (photo) detector, two off-gimbal, time multiplexed, modulated optical-reference sources and two alignment mirrors. Alternatively, a reference source may be located on the gimbal while individual light detectors are aligned with the sensor and laser beams.

More particularly, the present invention comprises at least one reference source that outputs at least one reference beam that is optically aligned with the line-of-sight of at least one sensor. A laser reference source outputs a laser reference beam that is optically aligned with the line-of-sight of the laser. A laser alignment mirror adjusts the alignment of the line of sight of the laser beam. A sensor alignment mirror adjusts the line of sight of the optical paths of the at least one sensor and the laser. Combining optics couples the plurality of reference beams along a common optical path. A light detector, or photodetector, disposed on gimbal apparatus that detects the plurality of reference beams. A processor is coupled to the light detector, and the alignment mirrors, processes signals detected by the photodetector, and outputs control signals to the respective mirrors to align the line-of-sight optical paths of the at least one sensor and the laser.

The present integrated system eliminates additional processor software loading, and the cost of, volume of, power of, and complexity to drive the stabilization mirror by combining the stabilization function with the auto-alignment function. This is achieved by dynamically steering the null of the alignment light detector with the inertial rate stabilization loop residual position error signal.

The present and previously developed off-gimbal sensor and laser auto-alignment systems have one alignment loop nested within the other, making the alignment capability of the outer alignment loop dependent on the performance inner of the loop. However, the present integral auto-alignment system has a feed across error term, wherein the inner loop error is summed into the outer loop error, to effectively decouple the outer and inner loops to minimize alignment errors between both loops.

Aligning the sensor(s) and laser lines of sight to the on-gimbal reference light detector is equivalent to having both the sensor(s) and laser mounted on a stabilized inner gimbal. Also, dynamic steering of the light detector null point provides a common optical reference path for enhanced stabilization of the sensor(s) and laser lines of sight.

The system provides for automatic boresighting and aligning of the sensor input beam coincident with the dynamic null of the on-gimbal light detector, which is mechanically aligned to the system line of sight, by correcting for initial sensor optical train component misalignments.

The system provides for dynamic maintenance of the sensor boresight by automatically correcting the sensor line of sight angle caused by deformations of the IR/CCD optical bench due to thermal and platform g-forces, nutation due to derotation mechanism wedge angle deviation errors, rotation axis eccentricity and misalignments, field of view switching mechanism misalignment, nutation due to gimbal non-orthogonality and tilt errors, and focus mechanism motion induced angle errors.

The system provides for enhanced dynamic stabilization of the sensor line of sight by automatically correcting the sensor line of sight angle for induced line of sight jitter due to linear and angular vibration inputs into the system by dynamically steering the light detector null. The system also provides for automatic boresighting and aligning of the laser output beam coincident to the dynamic null of the on-gimbal light detector, by correcting for initial laser optical train component misalignments and initial misalignment of the laser optical bench relative to the IR/CCD optical bench.

The system provides for dynamic maintenance of the laser boresight by automatically correcting the laser line of sight angle caused by deformation of the laser optical bench due to thermal and platform g forces, and relative angular motion between laser optical bench and isolated sensor optical bench due to linear and angular vibration and g-forces. The system provides for enhanced dynamic stabilization of the laser line of sight by automatically correcting the laser line of sight angle for induced line of sight jitter due to linear and angular vibration inputs by dynamically steering the light detector null. The enhanced dynamic stabilization compensates for the lower bandwidth inertial rate line of sight stabilization loops by feeding forward the residual rate loop line of sight inertial position error to dynamically steer the light detector null to simultaneously enhance the stabilization of both the laser and sensor(s) lines of sight.

The present auto-alignment and enhanced stabilization system eliminates the need for the previously used on-gimbal two-axis stabilization mirror. The residual inertial position error is summed into the auto-alignment light detector error output to essentially steer the beams, i.e., the light detector is operated linearly off the null position. By steering the light detector null with the residual position error, the aligned beam angles are correspondingly steered, performing the same function as the stabilization mirror.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
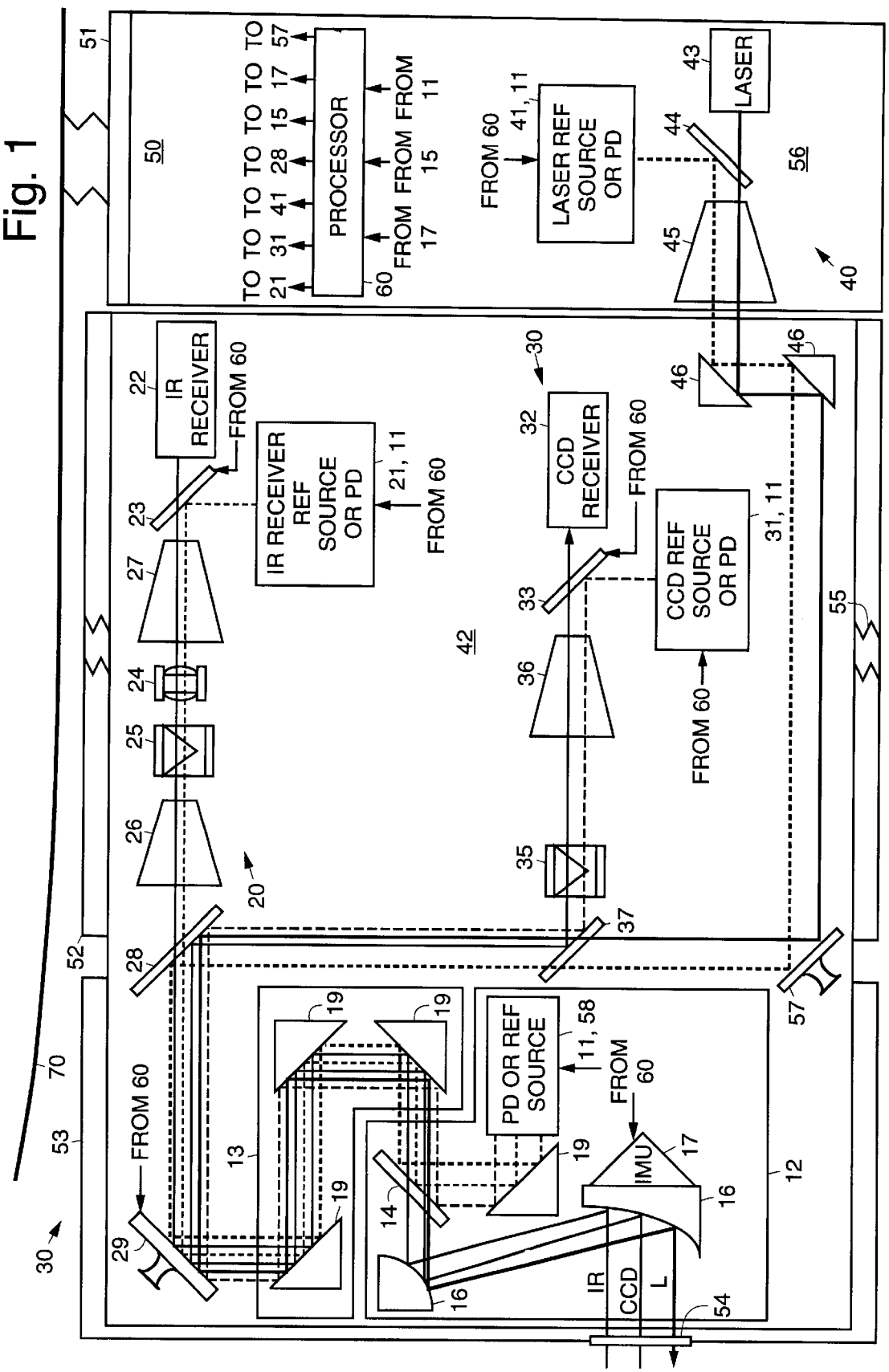
FIG. 1 illustrates exemplary auto-alignment and enhanced stabilization systems in accordance with the principles of the present invention.

Referring to the drawing figures, FIG. 1 illustrates exemplary auto-alignment and enhanced stabilization systems 10 in accordance with the principles of the present invention for providing line-of-sight alignment and stabilization of off-gimbal electro-optical passive and active sensors. One exemplary embodiment of the system 10 comprises a pseudo on-gimbal sensor 11 comprising a photodetector (PD) 11, or other light detector 11 disposed on an inner gimbal, an outer pitch gimbal 13 comprising a plurality of folding mirrors 19, an IR sensor 20, a visible CCD sensor 30 and a laser auto-alignment subsystem 40, three time-multiplexed modulated reference sources 21, 31, 41, and a processor 60, as illustrated in FIG. 1.

The inner and outer gimbals 12, 13, the IR sensor 20, and the visible CCD sensor 30 are disposed on an IR/CCD optical bench 42. The laser auto-alignment subsystem 40 is disposed on a laser optical bench 56, and the laser auto-alignment subsystem 40 and processor 60 are disposed in an aft pod 50 that is separated from the remainder of the system 10.

The reference sources 21, 31, 41 are time-multiplexed and pulse amplitude modulated to provide a simple multiplexing scheme without the need for extensive demodulation circuitry. High frequency (10 KHz) time modulated pulses are synchronously sampled at the peak output response of the photodetector 11 by the processor 60, enabling closure of high bandwidth auto-alignment servo loops. The exemplary system 10 is implemented as an improvement to an Advanced Targeting FLIR pod 50 having on-gimbal mirror fine stabilization.

The pod 50 is shown attached to an airborne platform 70 by a pod aft structure 51 that is coupled to the laser optical bench 56. An outer roll gimbal 52 carrying a wind screen 53 with a window 54 that is gimbaled with bearings (not shown) in pitch, and rolls on bearings (not shown) relative to the aft pod structure 51. The roll gimbal 52 also carries along, in roll, the IR/CCD optical bench 42 that is attached at its center of gravity using an elastic isolator 55 that attenuates both vibration of the platform 70 and aerodynamic load disturbances to the IR/CCD optical bench 42 to provide for stabilization.

The IR/CCD optical bench 42 houses the IR sensor 20 which comprises an IR sensor receiver 22, the time multiplexed modulated infrared (IR) reference source 21 that is mechanically aligned to the center of the field of view of the IR sensor receiver 22, a multi-spectral beam combiner 28 that combines beams of the coaligned IR sensor receiver 22 and the IR reference source 21. In the IR optical path is an IR imager 27 (or IR imaging optics 27), a focus mechanism 24, a reflective derotation mechanism 25 that derotates the IR beam to keep the IR image erect, and an IR relay beam expander 26 that expands the beams associated with the coaligned IR sensor receiver 22 and IR reference alignment source 21.

The IR/CCD optical bench 42 also houses the visible CCD sensor 30 which comprises a visible CCD sensor receiver 32, the time multiplexed modulated CCD optical reference source 31 that is mechanically aligned to the center of the field of view of the CCD sensor receiver 32, a beam combiner 33 that combines the coaligned beams associated with the CCD sensor receiver 32 and the CCD reference source 31. In the optical path is a visible imager 36 (or visible imaging optics 36), and a refractive derotation mechanism 35 that derotates the visible beam to keep the visible image erect.

The laser optical bench 56 in the exemplary system 10 is not isolated and does not rotate with the roll gimbal 52. The laser optical bench 56 houses a laser 43, the time multiplexed modulated laser reference source 41 that is mechanically aligned to the output beam of the laser 43, a beam combiner 44 that combines the beams from the coaligned laser and laser reference source 41, and a laser beam expander 45 that expands the beams from the coaligned laser 43 and laser reference source 41. A pair of reflectors 46 are optionally used to couple the beams from the coaligned laser 43 and laser reference source 41 to a two-axis laser alignment mirror 57 on the IR/CCD optical bench 42. The reflectors 46 may not be required for other system configurations.

The two-axis laser alignment mirror 57 steers beams from the laser 43 and laser reference source 41 into alignment with the IR beam and the beam from the IR reference source 21. The CCD/laser beam combiner 37 combines the coaligned visible beam and beam from the CCD reference source 41 with the coaligned beams from the laser 43 and the laser reference source 41. The multi-spectral beam combiner 28 combines these four beams with the IR beam and the beam from the IR reference source 21, and all six beams are steered together onto an inner gimbal 12 using a two-axis IR/CCD alignment mirror 29.

The IR/CCD optical bench 42 houses the outer pitch gimbal 13 on bearings (not shown) which in turn mounts the inner yaw gimbal 12 on bearings (not shown). The inner gimbal 12 houses a multi-spectral beamsplitter 14 which transmits the IR, visible and laser beams and reflects beams from the modulated reference sources 21, 31, 41 into the photodetector 11 by way of an optional folding mirror 19 to close nulling auto-alignment loops. Conversely, the multispectral beam splitter 14 may also reflect the IR, visible and laser beams, and transmit outputs of the modulated references sources 21, 31, 41, depending upon the optical layout on the inner gimbal 12. The photodetector 11 is mechanically aligned to the line of sight of a telescope beam expander 16. A three-axis fiber optic gyro, low noise, high bandwidth, inertial measurement unit (IMU) 17 is used to close the line-of-sight inertial rate stabilization loops, which generate fine stabilization mirror position commands relative to the line-of-sight of the inner gimbal 12. The wind screen 53 is slaved to the outer gimbal 13 to maintain the window 54 in front of the telescope beam expander 16.

A processor 60 is coupled to the photodetector 11, the IMU 17, and to the respective reference beam source 21, 31, 41 and alignment mirrors 29, 57. The processor 60 comprises software (illustrated in FIGS. 2–5) that implements closed loop feedback control of the alignment mirrors 29, 57 based upon the output of the photodetector 11 to adjust the alignment of the beams of the respective reference sources 21, 31, 41 to align the optical paths of the IR sensor receiver 22, the visible CCD sensor receiver 32 and the laser 43.

FIG. 1 also shows a second exemplary embodiment of the system 10. In the second exemplary embodiment of the system 10, a single reference source 58 is disposed on the inner gimbal 12 in place of the photodetector 11. In addition, the reference sources 21, 31, 41 used in the first embodiment are each replaced by a photodetector 11 (infrared sensor photodetector 11, infrared sensor photodetector 11, and laser photodetector 11).

The infrared sensor photodetector 11 has its line-of-sight optically aligned with the line-of-sight of the infrared sensor 20 or IR sensor receiver 22. The visible sensor photodetector 11 has its line-of-sight optically aligned with the line-of-sight of the visible sensor 30, or visible CCD sensor receiver 32. The laser photodetector 11 has its line-of-sight optically aligned with the line-of-sight of the laser 43. The single reference source 21 outputs a reference beam that is optically aligned with the lines-of-sight of each of the photodetectors 11.

The second exemplary embodiment of the system 10 operates in substantially the same manner as the first embodiment. The processor 60 controls the alignment of the alignment mirrors 29, 57 based upon the output of the photodetectors 11 to adjust the alignment of the beam of the single reference source 58 to align the optical paths of the IR sensor receiver 22, the visible CCD sensor receiver 32 and the laser 43.

Figure 2:
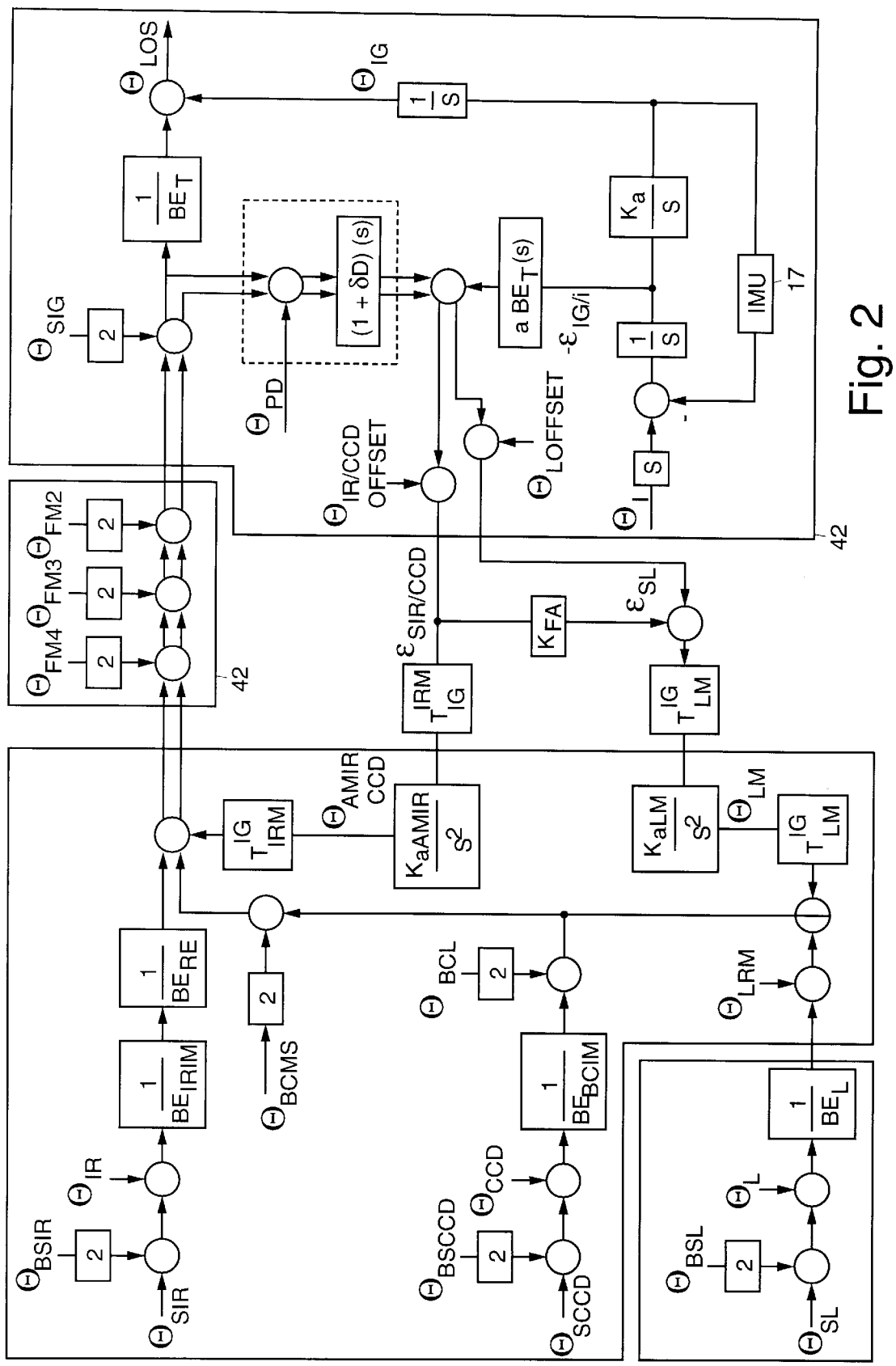
FIG. 2 illustrates a composite optical servo block of the exemplary system shown in FIG. 1.

The alignment of the IR sensor receiver 22 onto the inner gimbal 12 will now be discussed with reference to the first embodiment of the system 10. Alignment of the second embodiment of the system 10 is substantially the same and should be clear to those skilled in the art. An optical servo block diagram of the system 10 illustrated in FIG. 1 is shown in FIG. 2 and illustrates alignment and stabilization of the IR sensor receiver 22 in accordance with the principles of the present invention.

The definition of terms relating to alignment and stabilization of the IR/CCD optical bench 42 are as follows. The following terms and others that are discussed below are shown in FIGS. 2–5.

The definition of terms on the IR/CCD optical bench 42 (OB$_{IR}$) are as follows. $\Theta_{IR/OBIR}$ is the angle of the IR sensor line of sight relative to the IR/CCD optical bench 42. $\Theta_{SIR/OBIR}$ is the angle of the IR reference source line of sight relative to the IR/CCD optical bench 42. $\Theta_{BSIR/OBIR}$ is the angle of the IR reference source beam splitter relative to the IR/CCD optical bench 42. $\Theta_{IR/OBIR} - \Theta_{SIR/OBIR}$ is the angle between the IR sensor line of sight and the reference source line of sight, and is the mechanical alignment error.

BE$_{IRIM}$ is the optical magnification of the IR imager 27. BE$_{RE}$ is the optical magnification of the IR relay beam expander 26. $\Theta_{AMIRCCD/OBIR}$ is the angle of the alignment mirror 29 (AM$_{IR/CCD}$) relative to the IR/CCD optical bench 42. The alignment mirror 29 has an optical gain of $T_{IRIM}^{IG}$ relative to its angular motion on the incident beams relative to the inner gimbal photodetector axes. The motion of this mirror 29 aligns the IR or visible reference beam, and therefore the coaligned IR beam, to a photodetector detector null on the inner gimbal. $Ka_{AMIR}$ is the position loop gain of the alignment mirror 29. The sum of all of these angles is the angle of the IR and its reference beam exiting off the IR/CCD optical bench 42 in inertial space.

The definition of terms from the IR/CCD optical bench 42 ($OB_{IR}$) to the inner gimbal (IG) are as follows. $\Theta_{FM/OG}$ is the angle of the outer gimbal relay mirrors 19 relative to the outer gimbal 13. $\Theta_{BSIG/IG}$ is the angle of the inner gimbal beam splitter relative to the inner gimbal. $\Theta_{IG/i}$ is the angle of the inner gimbal in inertial space. $\Theta_{SIR/IG}$ is the total angle of the steered IR and reference beams relative to the inner gimbal, the on-gimbal IR reference source angle. $\Theta_{PD/IG}$ is the angle of the photodetector relative to the inner gimbal and mechanically aligned to the telescope line of sight, $1+\delta_{PD}$ is the photodetector scale factor and linearity error. $\alpha a\ BE_T$ is an electronic gain and phase matching term applied to the residual inertial position error input for stabilization. $\epsilon_{IG/i}$ is the inertial rate loop residual inertial position error. $\epsilon_{SIR/IG}$ is the null angle error between the photodetector, the on-gimbal IR reference angle, and the inertial rate loop residual position error:

$$(\Theta_{PD/IG}-\Theta_{SIR/IG})(1+\delta_{PD})+\alpha BE_T(\epsilon_{IG/i}).$$

The null is driven to zero by closing the beam nulling optical servo alignment loop. $\Theta_{IROFFSET}$ is an additional term added to statically or dynamically offset the null, similar to the residual inertial position error, as required to correct for misalignments or line-of-sight scanning functions. $T_{IG}^{IRM}$ is a coordinate transform to put the inner gimbal auto-alignment and stabilization errors into the proper alignment mirror axis coordinates.

For simplification, let the sum of all optical path disturbance angles up to the inner gimbal photodetector from the IR reference source be defined by ($\Theta_{SUM/IR}$):

$$\Theta_{SUM/IR}=(1/BE_{IRIM}\cdot BE_{RE})+[2\Theta_{BSIR/OBIR}]+2\Theta_{FM/OG}2\Theta_{BSIG/IG}$$

then the pseudo on-gimbal IR reference angle ($\Theta_{SIR/IG}$) is given by:

$$\Theta_{SIR/IG}=\Theta_{SUM/IR}+T_{IRIM}^{IG}\Theta_{AMIRCCD/OBIR}+(1/BE_{IRIM}\cdot BE_{RE})\Theta_{SIR/OBIR}$$

The photodetector null error ($\epsilon_{IR/IG}$) given by ($\epsilon_{IR/IG}=\Theta_{PD/IG}-\Theta_{SIR/IG}$) is driven to zero when the IR alignment mirror angle is driven to $$\Theta_{AMIRCCD/OBIR}=[-\Theta_{PD/IG}+(1/BE_{IRIM}\cdot BE_{RE})\Theta_{SIR/OBIR}+\Theta_{SUM/DIS}]/T_{IRM}^{IG}.$$

With the photodetector angle aligned to the line of sight defined as zero ($\Theta_{PD/IG}=0$) and the null angle error is driven to zero $\{\epsilon_{IR/IG}=[(\Theta_{PD/IG}-\Theta_{SIR/IG})(1+\delta_{PD})+\alpha BE_T(\epsilon_{IG/i})]=0\}$, then the on-gimbal IR reference angle is $\{\Theta_{SIR/IG}=\alpha BE_T (\epsilon_{IG/i})/(1+\delta_{PD})\}$, and the IR reference and, therefore, the IR receiver beam is continuously and dynamically aligned to the inertial rate loop residual inertial position error ($\epsilon_{IG/i}$) even if all the defined inertial and gimbal angles vary for whatever cause.

The processor 60 measures the photodetector alignment output null error ($\epsilon_{IR/IG}$) in two axes, and applies a coordinate transform ($T_{IG}^{IRM}$) to put the photodetector axes errors into the proper alignment mirror axis coordinates.

The transform is a function of mirror axes orientation relative to photodetector axes which rotate with the rotation of both the inner and outer gimbal angles. The processor then applies gain and phase compensation ($K_{AM}$) to the transformed errors to stabilize the closed servo loop. The processor then drives the alignment mirror inertia via a torquer amplifier until the mirror position ($\Theta_{AMIRCCD/OBIR}$) is such that the photodetector error ($\epsilon_{IR/IG}$) is zero.

In addition, the processor controls the amplitude of the reference source beams to maintain constant incident power on the photodetector 11 and the time multiplexing of the multiple reference source beams.

Figure 4:
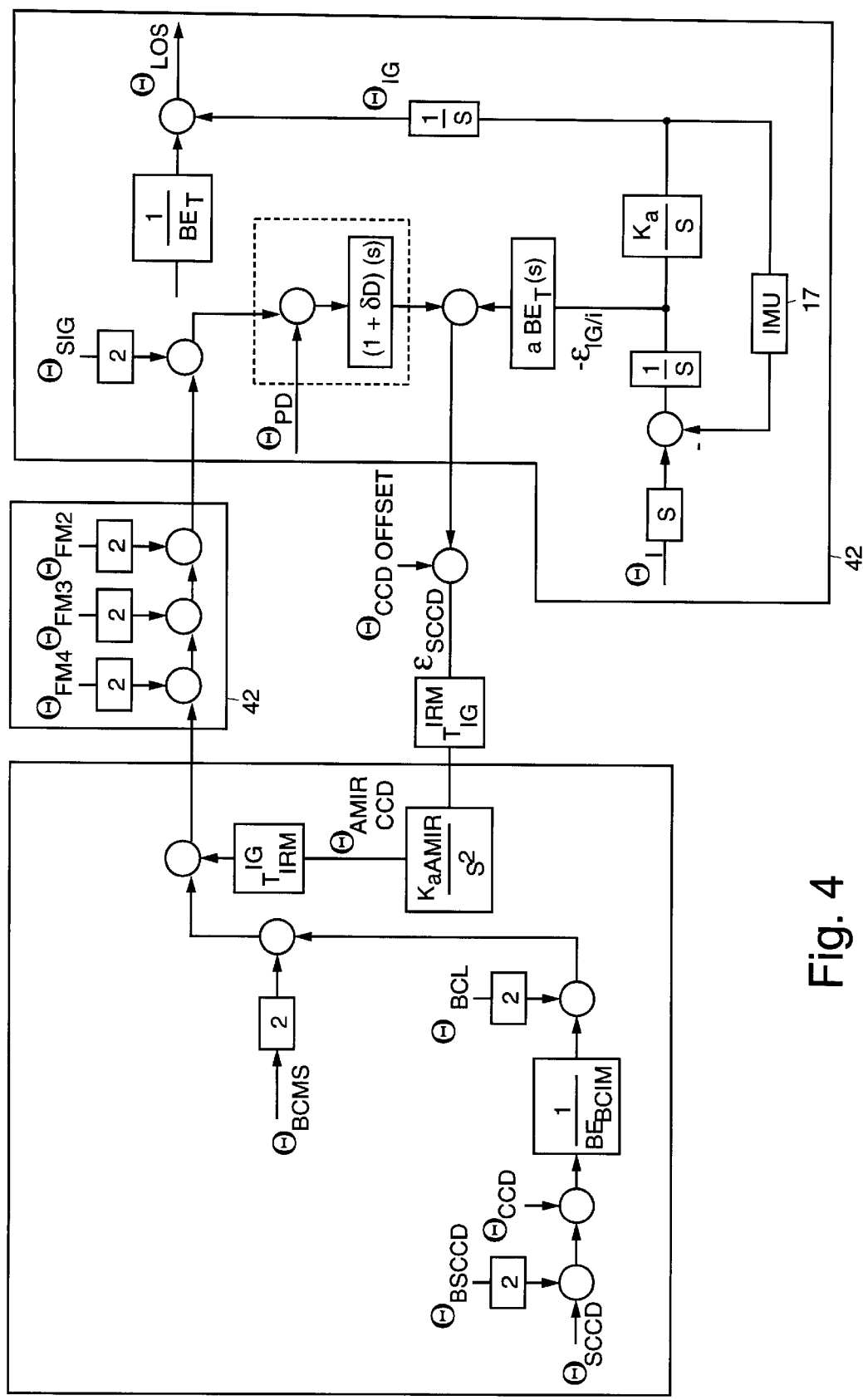
FIG. 4 illustrates an servo block diagram that provides for CCD camera line of sight stabilization of the CCD visible camera used in the system of FIG. 1.

The alignment operation for the visible CCD receiver 32 is similar and shown in FIG. 4. Since only one receiver 22, 32 is imaging at a time, i.e., only one optical reference source 21, 31 is excited at a time, the alignment mirror 29 ($AM_{IR/CCD}$) can service both the IR and visible channels. If both receivers 22, 32 are required to image simultaneously, another alignment mirror must be placed into one of the optical paths.

Figure 3:
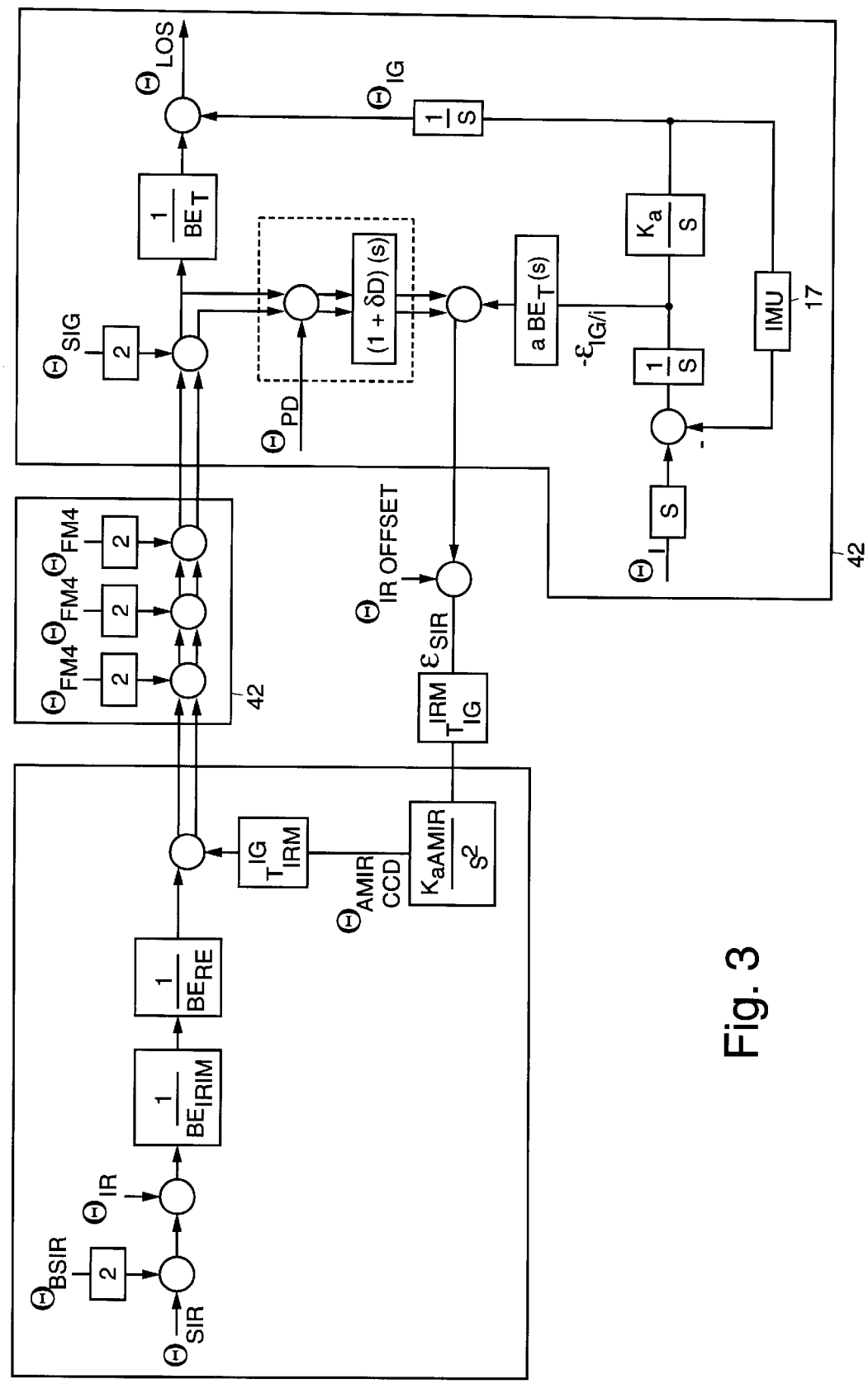
FIG. 3 illustrates an optical servo block diagram that provides for IR sensor line of sight stabilization of the IR sensor used in the system of FIG. 1.

Line of sight stabilization will now be discussed. The optical servo block diagram for IR sensor line of sight stabilization is also depicted in FIG. 3 for the IR sensor 20, FIG. 4 for the CCD visible camera 30 and in FIG. 5 for laser line of sight stabilization.

The definition of the inertial rate stabilization loop terms are as follows. $\Theta_{i/i}$ is the line of sight inertial rate loop command. IMU is the inertial rate measurement unit transfer function. $K_a$ is the inner gimbal rate stabilization loop gain transfer function. $\Theta_{IG/i}$ is the inner gimbal inertial position, and $\epsilon_{IG/i}$ is the inertial rate loop residual inertial position error=$-$IMU $\Theta_{IG/i}$.

Closure of the line of sight inertial rate loop with a low noise, high bandwidth IMU attenuates the input torque disturbances. The magnitude of the residual inertial position error ($\epsilon_{IG/i}$) is the measure of its effectiveness in inertially stabilizing the line of sight, and is the input to dynamically offset the null of the alignment mirror loops.

The definition of the stabilization terms for the stabilization loops are as follows. $BE_T$ is the optical magnification of the common telescope beam expander 16, and $\alpha BE_T$ is electronic gain and phase matching term applied to the auto-alignment/stabilization residual position error.

The on-gimbal IR reference angle, $\Theta_{SIR/IG}=\alpha BE_T (\epsilon_{IG/i})/(1+\epsilon_{PD})$, is steered relative to the inner gimbal as a function of the residual inertial position error ($E_{IG/i}$) which in turn steers the IR, visible, and laser beams. The beam, steered relative to the inner gimbal, and the inner gimbal inertial position combine to result in a highly stabilized inertial line of sight ($\Theta_{LOS/i}$).

When the electronic gain ($\alpha BE_T$) applied to the residual inertial position error ($\epsilon_{IG/i}$) is adjusted in magnitude and phase, such that the term ($\alpha$) closely matches the photodetector gain ($1+\delta_{PD}$) and the inverse of the IMU transfer function $[\alpha\sim(1+\delta_{PD})/\text{IMU}]$, the resulting inertial line of sight angle error ($\Theta_{LOS/i}$) approaches zero, e.g., $$\Theta_{LOS/i}=\Theta_{SIR/IG}/BE_T+\Theta_{IG/i}=[\alpha BE_T(\epsilon_{IG/i})/(1+\delta_{PD})]/BE_T+\Theta_{IG/i}$$

$$\Theta_{LOS/i}=\alpha(-IMU\Theta_{IG/i})/(1+\delta_{PD})+\Theta_{IG/i}=0$$

for $\epsilon_{IG/i}=-$IMU $\Theta_{IG/i}$ and $\alpha\sim(1+\delta_{PD})/$IMU.

The processor 60 closes the inertial rate loop to stabilize the line of sight. The IMU measures the inertial rate of the inner gimbal on which it is mounted. The IMU inertial rate output measurement is compared to the commanded inertial rate ($\Theta_{i/i}$). The resulting rate error is integrated to provide the residual inertial position error ($\epsilon_{IG/i}$).

The processor 60 then applies gain and phase compensation ($K_a$) to the errors to stabilize the closed servo loop. The processor 60 then drives inertias of the inner and outer gimbals 12, 13 via torquer amplifiers until the gimbal inertial rates are such that the rate errors are zero.

Figure 5:
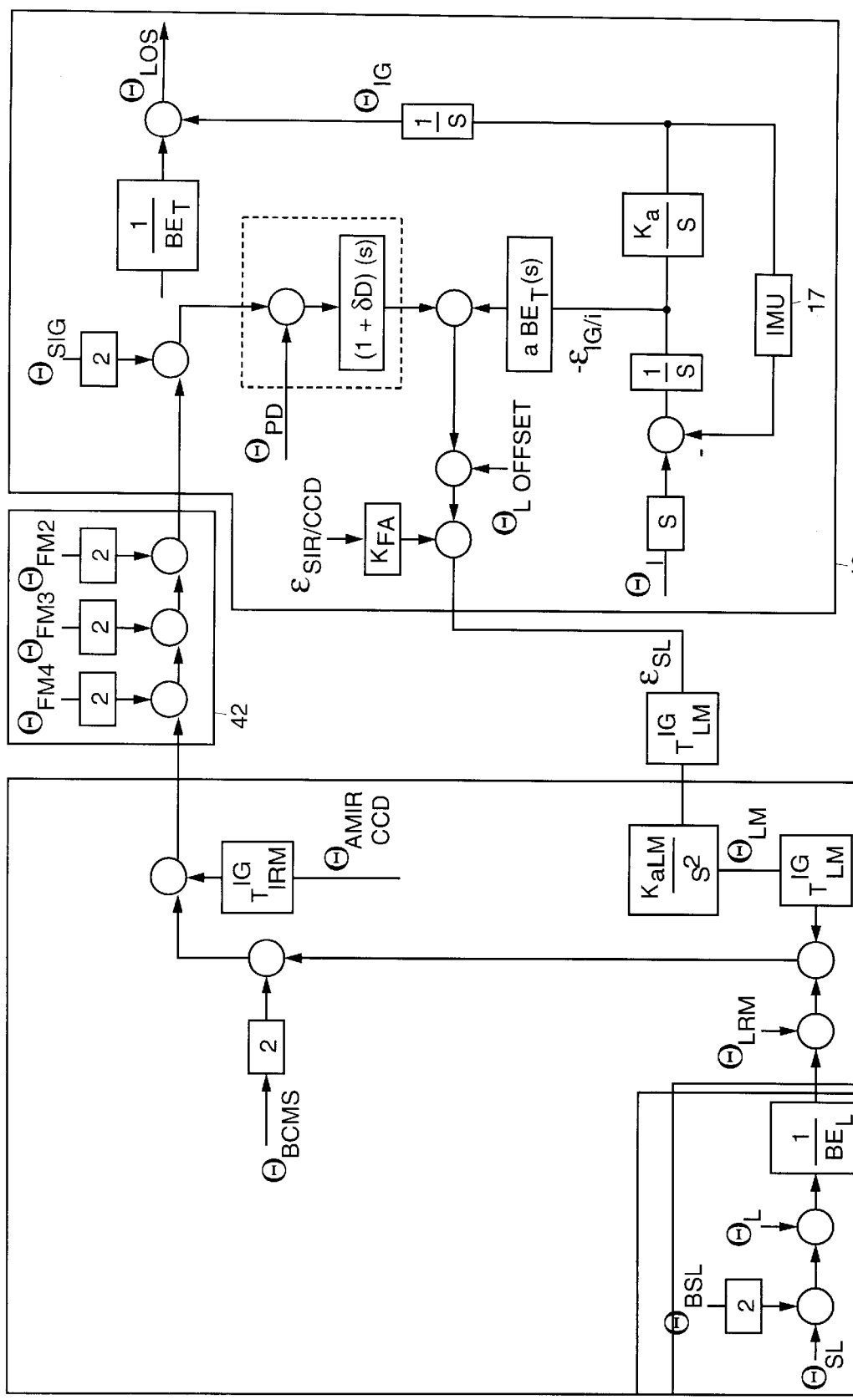
FIG. 5 illustrates an servo block diagram that provides for laser line of sight stabilization of the laser used in the system of FIG. 1.

Laser alignment onto the inner gimbal 12 will now be discussed. The laser line of sight alignment and stabilization is similar to the IR receiver 22 and CCD receiver 32 alignment, except that the laser reference source 41 ($S_L$) is used to close the alignment loop by driving the laser alignment mirror 57 ($AM_L$). The optical servo block diagram of the system 10 illustrated in FIG. 1 is depicted in FIG. 5 for laser alignment and stabilization.

The definition of laser alignment terms are as follows. $\Theta_{L/OBL}$ is the angle of the laser relative to the laser optical bench 56. $\Theta_{SL/OBL}$ is the angle of the laser reference source relative to the laser optical bench 56. $\Theta_{BSL/OB\ L}$ the angle of the laser beam combiner relative to the laser optical bench 56. $\Theta_{L/OBL} - \Theta_{SL/OBL}$ is the angle between the laser and the reference, and is the mechanical alignment error. $BE_L$ is the optical magnification of the laser beam expander 45. $\Theta_{LRM/OBIR}$ is the angle of the laser relay mirrors 46 relative to the laser optical bench 56, and $\Theta_{AML/OBIR}$ is the angle of the laser alignment mirror 57 ($AM_L$) relative to the laser optical bench 56.

The laser alignment mirror 57 has an optical gain of $T_{LM}^{IG}$ relative to its angular motion on the incident laser and reference beams relative to the axes of the photodetector 11. The motion of this mirror 57 aligns the laser reference beam, and therefore, the coaligned laser beam, to a detector null on the inner gimbal 12.

$K_{AM}$ is the position loop gain of the laser alignment mirror 57. $\Theta_{BCMS/OBIR}$ is the angle of the multi-spectral beam combiner 28 relative to the IR/CCD optical bench 42 and $\Theta_{AMIRCCD/OBIR}$ is the angle of the IR/CCD alignment mirror 29 ($AM_{IR/CCD}$) relative to the IR/CCD optical bench 42.

The sum of all of these angles is the angle of the laser 43 and its reference beam exiting off the laser optical bench 56 in inertial space.

The definition of terms from the IR/CCD optical bench 42 ($OB_{IR}$) to the inner gimbal 12 (IG) are as follows. $\Theta_{FM/OG}$ is the angle of the outer gimbal relay mirrors 19 relative to the outer gimbal 13. $\Theta_{IG/i}$ is the angle of the inner gimbal 12 in inertial space. $\Theta_{SL/IG}$ is the total angle of the steered laser and reference beams relative to the inner gimbal, the on-inner gimbal laser reference source angle. $\Theta_{PD/IG}$ is the angle of the photodetector 11 relative to the inner gimbal and mechanically aligned to the line of sight of the telescope beam expander 16.

$1 + \delta_{PD}$ is the photodetector scale factor and linearity error. $\alpha BET_T$ is electronic gain and phase matching term applied to the residual inertial position error input for stabilization. $\epsilon_{IG/i}$ is the inertial rate loop residual inertial position error, and $\epsilon_{L/IG}$ is the null angle error between the photodetector 11, the on-gimbal laser reference angle, and the inertial rate loop residual position error $(\epsilon_{PD/IG} - \Theta_{SL/IG})(1+\delta_{PD}) + \alpha BET_T$ ($\epsilon_{IG/i}$). The null is driven to zero by closing the beam nulling optical servo alignment loop. $T_{IG}^{LM}$ is a coordinate transform to put the auto-alignment/stabilization errors into the proper alignment mirror axis coordinates.

The laser auto-alignment is similar to the IR receiver 22, for simplification, let the sum of all optical path disturbance angles up to the photodetector 11 from the laser reference source 41 ($\Theta_{SL/OBL}$) be defined by $\Theta_{SUM/L}$, where $$\Theta_{SUM/L} = (1/BE_L)[2\Theta_{BSL/OBL}] + 2\Theta_{LRM/OBIR} + 2\Theta_{BCMS/OBIR} + T_{IRM}^{IG}\Theta_{AMIRCCD/OBIR} + 2\Theta_{FM/OG} + 2\Theta_{BSIG/IG}$$

then the pseudo on-gimbal laser reference angle ($\Theta_{SL/IG}$) is given by $$\Theta_{SL/IG} = \Theta_{SUM/L} + T_{LM}^{IG}\Theta_{AML/OBIR} + (1/BE_L)\Theta_{SL/OBL}$$

The photodetector null error ($\epsilon_{L/IG}$) given by ($\epsilon_{L/IG} = \Theta_{PD/IG} - \Theta_{SL/IG}$) is driven to zero when the laser alignment mirror angle is driven to $$\Theta_{AML/OBIR} = [-\Theta_{PD/IG} + (1/BE_L)\Theta_{SL/OBL}\Theta_{SUM/L}]/T_{LM}^{IG}.$$

With the detector angle aligned to the line of sight defined as zero ($\Theta_{PD/IG}=0$) and the null angle error driven to zero $\{\epsilon_{L/IG}=[(\Theta_{PD/IG}-\Theta_{SL/IG})(1+\delta_{PD}) + \alpha\ BE_T(\epsilon_{IG/i})]=0\}$, then the on-gimbal laser reference source angle is $\{\Theta_{SL/IG}=\alpha BE_T (\epsilon_{IG/i})/(1+\delta_{PD})\}$, and the laser reference and, therefore, the laser beam is continuously and dynamically aligned to the inertial rate loop residual inertial position error ($\epsilon_{IG/i}$) even if all the defined inertial OB and gimbal angles vary for whatever cause.

$\Theta_{LOFFSET}$ is an additional term added to statically or dynamically offset the null, similar to the residual inertial position error, as required to correct for misalignments.

The processor 60 measures the photodetector alignment output null error ($\epsilon_{L/IG}$) in two axes, and applies a coordinate transform ($T_{IG}^{LM}$) to put the photodetector axes errors into the proper alignment mirror axis coordinates.

The coordinate transform ($T_{IG}^{LM}$) is a function of mirror axes orientation relative to photodetector axes which rotate with the rotation of both the inner and outer gimbal angles. The processor 60 then applies gain and phase compensation ($K_{AM}$) to the transformed errors to stabilize the closed servo loop. The processor 60 then drives the inertia of the alignment mirror 29 via a torquer amplifier until the mirror position ($\Theta_{AML/OBIR}$) is such that the photodetector error ($\epsilon_{L/IG}$) is zero.

The stabilization of the line of sight of the laser 43 is equivalent to that of the IR and visible sensors 20, 30, since all the beams are all dynamically aligned to the same on-gimbal photodetector 11, they then all share the same optical path forward, i.e., the telescope beam expander 16.

A brassboard of the present invention including IR/CCD optical bench 42 and IR receiver 22, which embodied a laser and an analog version of the auto-alignment system 10, was functionally qualitatively and quantitatively tested. A disturbance mirror was added to the laser optical path to simulated dynamic angular disturbances to demonstrate the ability of the auto-alignment system 10 to correct for both initial static IR sensor 20 and laser line of sight misalignment as well as continuous dynamic correction of the line of sight.

Figure 6:
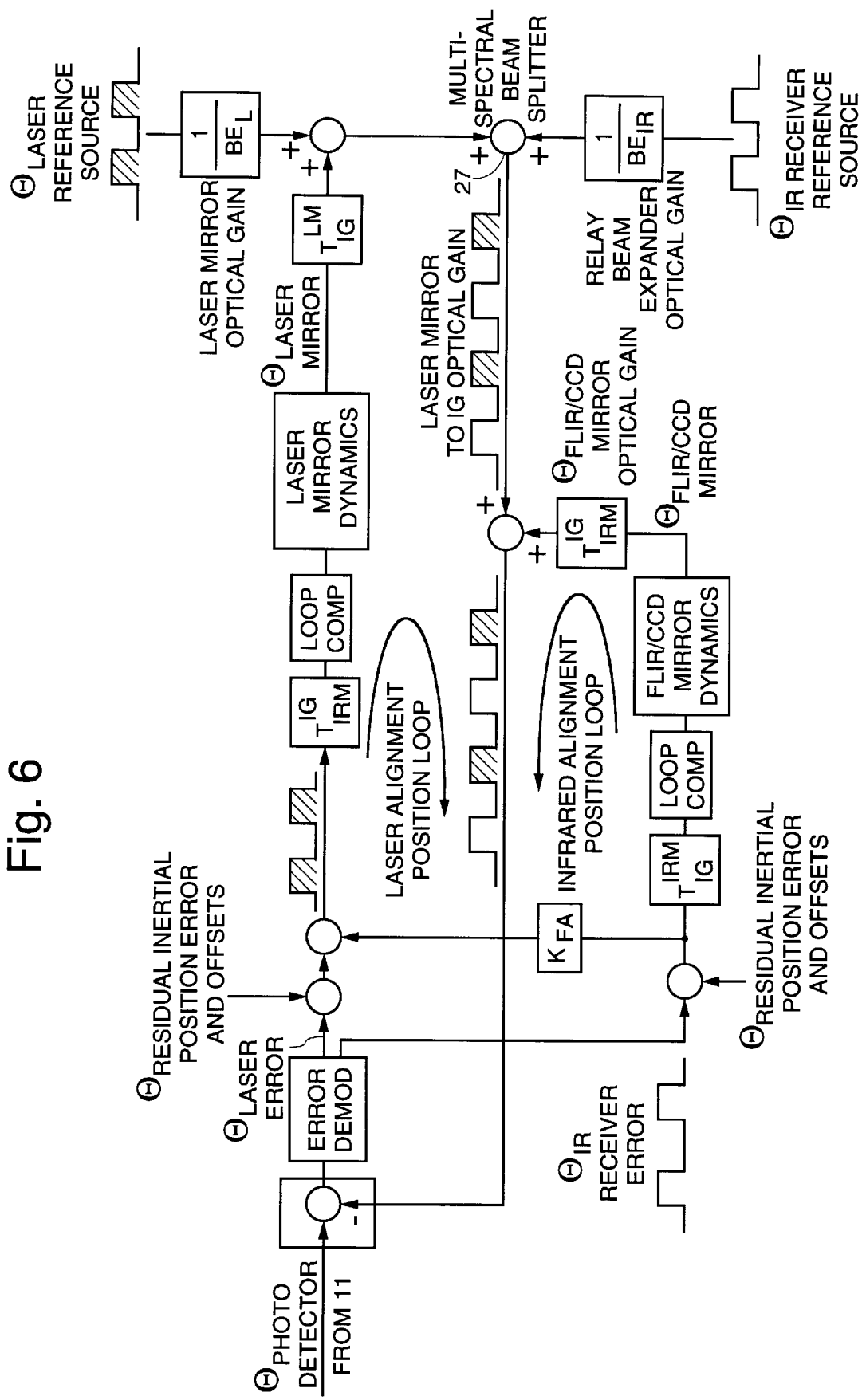
FIG. 6 illustrates a simple servo block diagram showing the auto-alignment and stabilization configuration and time multiplexed reference source modulation used in the system of FIG. 1.

A simple servo block diagram, illustrating the auto-alignment and stabilization system 10 and time multiplexed reference source modulation, is shown in FIG. 6.

Figure 7B:
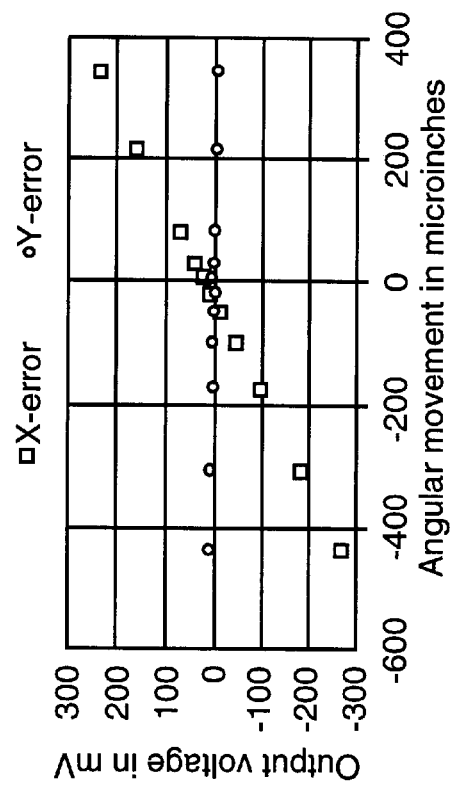
FIGS. 7a and 7b illustrate graphs of a quadrant photodetector error signal versus spot position.
Figure 7A:
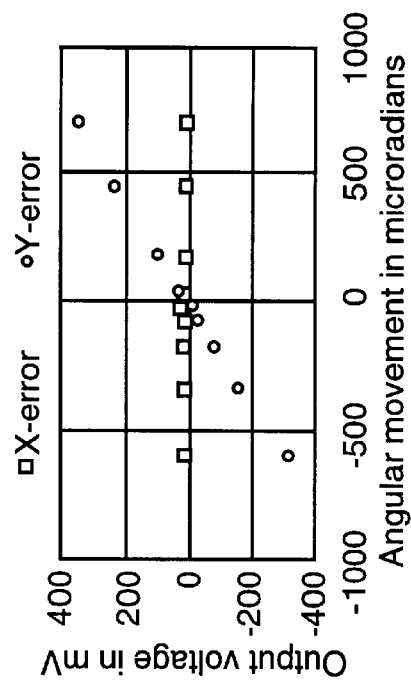

As stated previously, the photodetector 11 may be a photo-potentiometer or a quadrant detector operated off null. The brassboard configuration used a quadrant detector operating at null. However to confirm linear operation of a quadrant detector off null, a recent plot of the quadrant photodetector error signal versus spot position is shown in FIG. 7.

Calibration issues will now be discussed. If the scale factors $(1+\epsilon_{PD})$ from photodetector 11 to photodetector 11 vary, they can be calibrated as a unit or automatically when installed in the system 10 with a simple calibration algorithm, e.g., knowing the alignment mirror axes optical gains ($G_{OPAM}$, e.g. $G_{OPAM}=T_{IRM}^{IG}$) to the photodetector, with the auto-alignment loops closed, command a residual inertial position angle ($\epsilon_{IG/i}=\Theta_{CAL}$), adjust the command gain amplitude ($\alpha BE_T$) such that the mirrors 29, 57 move the a priori known and measurable angle ($\Theta_{AM}=\Theta_{CAL}BE_T/G_{OPAM}$) to compensate for ($1+\epsilon_{PD}$). When the measured alignment mirror angle is at $\Theta_{AM}=\Theta_{CAL}BE_T/G_{OPAM}$, then $\alpha\sim(1+\delta_{PD})$, and the detector scale factor error is compensated for. The value of ($\alpha$) is stored in the processor 60 and the calibration process is repeated for additional angles on the calibration curve if required.

The auto-calibration routine assumes that the measured alignment mirror position readouts are sufficiently accurate and linear.

Figure 8:
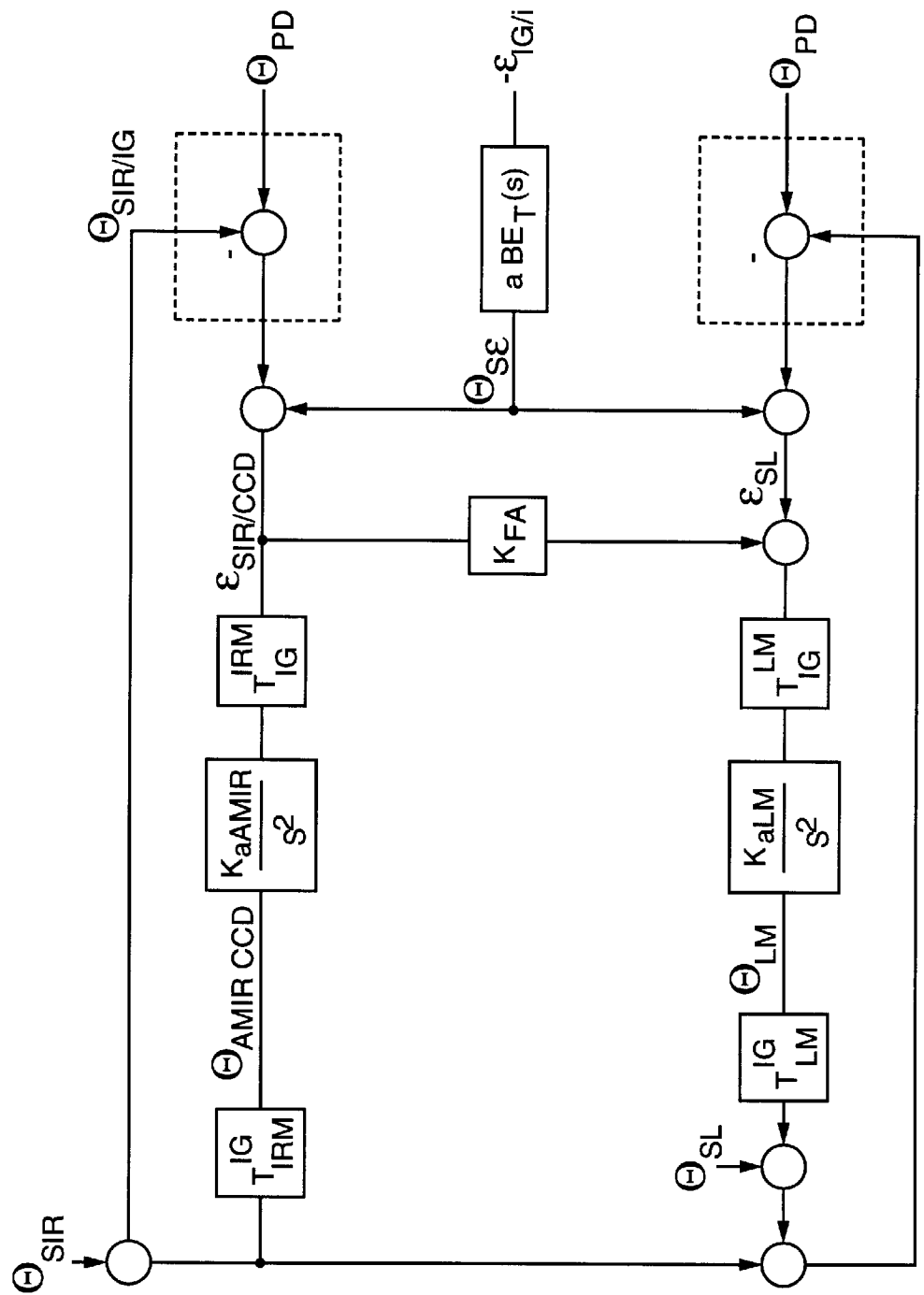
FIG. 8 illustrates that the outer loop alignment is decoupled from the inner loop in the system of FIG. 1.

Feed across outer alignment loop decoupling will now be discussed. The sensor and laser auto-alignment system 10 has one alignment loop nested within the other, making the outer alignment loop's alignment capability dependent on the inner loop's performance. However, the integral auto-alignment system 10 has a feed across error term Kfa $\epsilon_{SIR/G}$, i.e., the scaled (Kfa) inner loop error ($\epsilon_{SIR}$) summed into the outer loop error ($\epsilon_{SL}$), that effectively decouples the outer loop alignment from the inner loop, thereby minimizing the inner gimbal reference alignment errors ($\Theta_{SIR/IG}-\Theta_{SL/IG}$) between both loops, as shown in FIG. 8.

The alignment performance of the IR reference source 21 ($\Theta_{SIR}$) at the inner gimbal photodetector 11 ($\Theta_{SIR/IG}$) is given by:

$$(\Theta_{SIR/IG})=[(s^2/Ka_{AMIR})/(s^2/Ka_{AMIR}+1)]\Theta_{SIR}+(\Theta_{PD}+\Theta_S)/(s^2/Ka_{AMIR}+1).$$

The IR reference source disturbance ($\Theta_{SIR}$) is attenuated up to the open loop cross over frequency given by the square root of the gain ($Ka_{AMIR}$) and the photodetector position ($\Theta_{PD}$) and scaled residual position error ($\Theta_S$) are followed by the servo up to the open loop cross over frequency.

The alignment performance of the laser reference source 41 ($\Theta_{SL}$) at the inner gimbal photodetector 11 ($\Theta_{SL/IG}$) is similarly given by:

$$(\Theta_{SL/IG})=[(s^2/Ka_{LM})/)s^2/Ka_{LM}+1)]\Theta_{SL}+(\Theta_{PD}+\Theta_S)/(s^2/Ka_{LM}+1)+(-Kfa+Ka_{AMIR}/Ka_{LM})(\epsilon_{SIR})/(s^2/Ka_{LM}+1).$$

Similarly, the laser reference source disturbance ($\Theta_{SL}$) is attenuated up to the open loop cross over frequency given by the square root of the gain ($Ka_{LM}$) and the photodetector position ($\Theta_{PD}$) and scaled residual position error ($\Theta_S$) are followed up to the open loop crossover frequency. However, another disturbance term($-Kfa+Ka_{AMIR}/Ka_{LM})(\epsilon_{SIR}$) is also followed, making the loop performance depends on the inner loop error ($\epsilon_{SIR}$)

This alignment disturbance error can be eliminated or minimized, thereby decoupling the outer loop from the inner loop, making the outer loop performance independent of the inner loop if the feed across gain term (Kfa) is made proportional to the open loop gain terms, Kfa=$Ka_{AMIR}/Ka_{LM}$. For equal open loop gains or crossover frequency, the feed across gain term reduces to unity, Kfa=1.

Thus, an improved system that provides for line of sight stabilization and auto alignment of off-gimbal passive and active electro-optical sensors has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. Optical apparatus for use in auto-aligning line-of-sight optical paths of at least one sensor and a laser, comprising:
   at least one reference source for outputting at least one reference beam that is optically aligned with the line-of-sight of the at least one sensor;
   a laser reference source for outputting a laser reference beam that is optically aligned with the line-of-sight of the laser;
   a laser alignment mirror for adjusting the alignment of the line of sight of the laser beam;
   a sensor alignment mirror for adjusting the line of sight of the optical paths of the at least one sensor and the laser;
   combining optics for coupling the plurality of reference beams along a common optical path;
   gimbal apparatus;
   a light detector disposed on the gimbal apparatus for detecting the plurality of reference beams; and
   a processor coupled to the detector, the laser alignment mirror, and the sensor alignment mirror, for processing signals detected by the detector and outputting control signals to the respective mirrors to align the line-of-sight optical paths of the at least one sensor and the laser.

2. The apparatus recited in claim 1 wherein the at least one sensor comprises an infrared sensor, and the at least one reference source comprises an infrared reference source.

3. The apparatus recited in claim 1 wherein the at least one sensor comprises an visible sensor, and the at least one reference source comprises an visible reference source.

4. The apparatus recited in claim 2 wherein the at least one sensor further comprises an visible sensor, and the at least one reference source further comprises an visible reference source.

5. The apparatus in claim 1 wherein the infrared reference source, the visible reference source and the laser reference source 41 comprise time-multiplexed modulated reference sources to differentiate between multiple reference source beams for individual control of the steering mirrors.

6. The apparatus recited in claim 1 which comprises inner and outer servo alignment control loops, and wherein the inner alignment loop error is summed into the outer alignment loop error to effectively decouple the outer loop from the inner loop to minimize alignment errors between both loops.

7. The apparatus recited in claim 6 wherein residual inertial position error is summed into the error output of the light detector to steer the beams, such that the light detector is operated linearly off the null position to inertially fine stabilize the reference beams and their respective sensor line of sight.

8. Optical apparatus for use in auto-aligning line-of-sight optical paths of an infrared sensor, a visible sensor, and a laser, comprising:
   an infrared reference source for outputting an infrared reference beam that is optically aligned with the line-of-sight of the infrared sensor;
   a visible reference source for outputting a visible reference beam that is optically aligned with the line-of-sight of the visible sensor;
   a laser reference source for outputting a laser reference beam that is optically aligned with the line-of-sight of the laser;
   a laser alignment mirror for adjusting the alignment of the laser beam;

an alignment mirror for adjusting the alignment of the infrared sensor, the visible sensor, and the laser;

combining optics for coupling the plurality of reference beams along a common optical path to the alignment mirror;

gimbal apparatus;

a light detector disposed on the gimbal apparatus for detecting the plurality of reference beams; and a processor coupled to the detector, the laser alignment mirror, and the alignment mirror, for processing signals detected by the detector and outputting control signals to the respective mirrors to align the line-of-sight optical paths of the infrared sensor, the visible sensor, and the laser.

9. The apparatus recited in claim 8 wherein the infrared reference source, the visible reference source and the laser reference source comprise time-multiplexed modulated reference sources.

10. The apparatus recited in claim 8 wherein the light detector comprises a photodetector optically wavelength filtered to detect the reference beam wavelength.

11. The apparatus recited in claim 8 further comprising:

one or more additional off-gimbal active or passive sensors;

an a multiplexed reference source aligned to the line of sight of each additional sensor; and an additional steering mirror in the optical path of each additional sensor which is to be used simultaneously.

12. The apparatus recited in claim 8 wherein the processor 60 comprises an algorithm that automatically calibrates the response scale factor of the light detector by moving the calibrated alignment mirrors a known angle and adjusting the light detector command gain to match the apriori known response amplitude, and wherein the closed alignment loops drive the respective alignment mirrors as required to steer the beams.

13. The apparatus recited in claim 8 wherein the processor offsets the line of sight of selected sensors to compensate for reference source to sensor misalignments, and/or system line of sight shifts with field of view changes by offsetting individual or composite light detector reference beam nulls by apriori known offset angles.

14. The apparatus recited in claim 8 wherein the processor 60 dynamically steers the line of sight of selected sensors within the telescope field of view to provide line of sight scanning capability by proportionally dynamically offsetting individual or composite light detector reference beam nulls by apriori known offset scan angles.

15. Optical apparatus for use in auto-aligning line-of-sight optical paths of an infrared sensor, a visible sensor, and a laser, comprising:

an infrared sensor light detector having a line-of-sight that is optically aligned with the line-of-sight of the infrared sensor;

a visible sensor light detector having a line-of-sight that is optically aligned with the line-of-sight of the visible sensor;

a laser light detector having a line-of-sight that is optically aligned with the line-of-sight of the laser;

a laser alignment mirror for adjusting the alignment of the laser beam;

an alignment mirror for adjusting the alignment of each of the light detectors;

gimbal apparatus;

a reference source disposed on the gimbal apparatus for outputting a reference beam that is optically aligned with the lines-of-sight of each of the light detectors;

combining optics for coupling the reference beam from the alignment mirror to the respective light detectors; and a processor coupled to the detector, the laser alignment mirror, and the alignment mirror, for processing signals detected by the detector and outputting control signals to the respective mirrors to align the line-of-sight optical paths of the infrared sensor, the visible sensor, and the laser.

* * * * *